United States Patent [19]

Reiner et al.

[11] Patent Number: 4,659,112
[45] Date of Patent: Apr. 21, 1987

[54] IDENTIFICATION SYSTEM COMPRISING A PARTIALLY REFLECTIVE RETARDATION DEVICE

[75] Inventors: Daniel T. Reiner, Somis; Lawrence Bolt, Newbury Park; Philip W. Morlan, Jr., Thousand Oaks; Ali Tavasolian, North Hollywood, all of Calif.

[73] Assignee: Optical Devices, Incorporated, Camarillo, Calif.

[21] Appl. No.: 677,427

[22] Filed: Dec. 3, 1984

[51] Int. Cl.$^4$ ............................................. B42D 15/00
[52] U.S. Cl. ........................................ 283/90; 283/87; 283/904; 350/397
[58] Field of Search ................... 250/566; 283/90, 87, 283/904; 350/346, 397, 406

[56] References Cited

U.S. PATENT DOCUMENTS

| | | | |
|---|---|---|---|
| 2,256,093 | 9/1941 | Land | 40/120 |
| 2,497,405 | 2/1950 | Glover | 250/230 |
| 3,313,052 | 4/1967 | Malster | 40/2.2 |
| 3,313,941 | 4/1967 | Marks | 250/566 |
| 3,391,479 | 7/1968 | Buzzell et al. | 283/90 |
| 3,671,104 | 6/1972 | Seino | 350/157 |
| 4,025,688 | 5/1977 | Nagy et al. | 350/397 X |
| 4,250,393 | 2/1981 | Greenaway | 250/566 |
| 4,294,509 | 10/1981 | Nago | 350/400 |
| 4,343,851 | 8/1982 | Sheptak | 428/212 |
| 4,379,634 | 4/1983 | Rosenthal | 350/407 X |

*Primary Examiner*—Paul A. Bell
*Attorney, Agent, or Firm*—Richard S. Roberts; Tatsuya Ikeda; James C. Lydon

[57] ABSTRACT

There is disclosed a tamper-free identification system, such as an ID card, comprising an information-bearing substrate made of a flexible but substantially rigid material, a partial light reflector superposed over said substrate which produces a substantially nondepolarizing light reflection, and a substantially transparent 90° retarder superposed over said reflector. Said identification card can be manufactured at low cost using techniques known in the art, and with the aid of a simple and inexpensive analyzer such as a linear light polarizer, fraudulent alternations of the identification card can readily be detected.

18 Claims, 1 Drawing Figure

IDENTIFICATION SYSTEM COMPRISING A PARTIALLY REFLECTIVE RETARDATION DEVICE

BACKGROUND OF THE INVENTION

This invention relates to an identification card comprising a partially light reflective retardation device. Said identification card is tamper-free and can be manufactured at low cost using techniques known in the art.

Identification cards such as so-called credit cards or security cards bearing information relating to the identification of the card holder have been used for a long time and various types have been proposed or used in commerce. Many of the earlier types of such identification cards had a serious disadvantage that they could be altered without telltale signs of alteration. In order to rectify the above-mentioned disadvantage of the earlier types of identification cards and thereby enhance the security aspect of such identification cards, various identification cards have been proposed in the past which comprise a means for detecting the alteration of the information or indicia contained in the card. Various physical or chemical principles have been utilized for detecting alterations of the card.

The present invention relates to a novel, tamper-free identification card which utilizes light polarization effect as a means for detecting fraudulent alterations of the card. Said light polarization effect is produced by a partially reflective retardation device. Thus, the identification card of this invention comprises an information-bearing substrate made of, for instance, a flexible but substantially rigid material, a partial reflector superposed over said substrate and a substantially transparent 90° retarder superposed over said retarder. Said retarder/reflector combination which constitutes a partially reflective retardation device is sufficiently transparent so that the information contained in said substrate is visible to the eye through said retarder/reflector combination but at the same time is sufficiently reflective to produce the light polarization effect described below in more detail so that alterations of the identification card can readily be detected. Said retarder/reflector lamination is substantially transparent in both the altered and unaltered states, but when viewed through a detection device comprising, for instance, a linear light polarizer, the sign of the alteration of the card becomes immediately obvious as a color contrast between the altered and unaltered areas of the card. The identification card of this invention can be manufactured at a low cost and it does not require any expensive detection device.

DETAILED DESCRIPTION OF THE INVENTION

Figure 1:
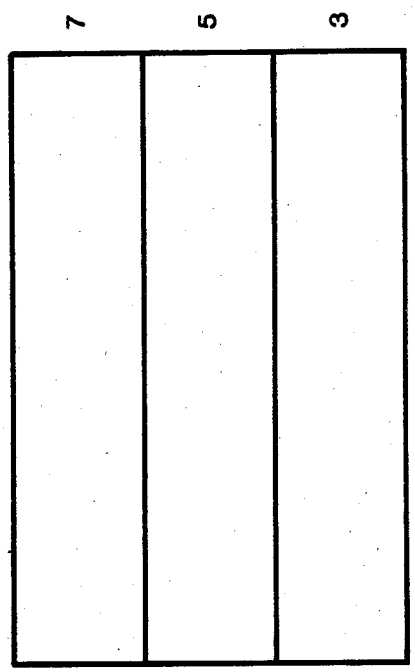
FIG. 1 is a schematic view of the structure of the invention.

The identification card of this invention comprises an information-bearing substrate 3 made of a flexible but substantially rigid material, a partial light reflector 5 superposed over said substrate which produces a substantially nondepolarizing light reflection, and a substantially transparent 90° retarder 7 superposed over said reflector.

The information-bearing substrate is a sheet-like material of suitable size which is flexible but substantially rigid. It may be made of any material known in the art of identification/security cards. Typically, it is made of a plastic material such as polyvinyl chloride. Said substrate contains one or more pieces of information such as identification number, photograph or the like. A portion of the substrate may be embossed by use of a technique well known in the art.

The partially light-reflective layer used in this invention is a layer which has a reflectance sufficient to create the light polarization effect described below in more detail and yet is transparent enough so that the information contained in the substrate is sufficiently visible to the viewer through the partially reflective layer. It may be prepared, for instance, by vapor-depositing a light-reflective metal over a suitable material such as a thin plastic film or directly over the information bearing substrate. It may also be a thin reflective metal foil laminated to another material such as a thin plastic film. It may also be a free standing reflective metal foil which is to be subsequently affixed to the information bearing substrate. Thus, the partial reflector may be prepared, for instance, by vapor-depositing a suitable metal, such as aluminum, silver or gold over a suitable plastic film such as poly(ethyleneterephthalate), polypropylene or polyethylene. It may also be prepared, for instance, by laminating a suitable thin metal foil such as aluminum, tin or steel having a thickness of about 0.0003–0.0015 inch, more preferably about 0.0005–0.001 inch to a suitable plastic film such as poly(ethyleneterephthalate), polypropylene or polyethylene having a thickness of about 0.001–0.005 inch, more preferably about 0.002–0.003 inch. It may also be a free standing metal foil such as aluminum or tin foil of about 0.003 inch thickness. In the case of vapor deposition, the material to be coated is placed in a vacuum chamber and a metal vapor source placed at another location within the vacuum chamber is heated to an elevated temperature by use of a suitable technique such as electron beam bombardment and thereby the metal is vaporized and the resultant metal vapor is allowed to deposit over the surface of the material. The thickness of the metal layer should be adjusted so as to obtain a suitable percentage of light reflection. It will be appreciated that the poly(ethyleneterephthalate), polypropylene and polyethylene layers mentioned above are not reflective layers and are not indispensable elements of this invention. In the above example, they are used for the convenience of manufacturing the partially reflective retarder device. When such an intermediate layer is absent, the light reflective layer may be directly deposited over the substrate or may be deposited first over the retarder and then the combination may be affixed to the substrate.

The partially reflective surface should be sufficiently nondepolarizing in character so that a sufficient extent of light polarizing effect may be obtained when light impinges upon the retarder/partial reflector lamination and is partially reflected by said partial reflector. As is well known, reflection of light which substantially retains the polarization property of the impinging light is called specular reflection. Thus, said reflective surface should produce a sufficient extent of specular reflection of the impinging light.

Said reflective layer is affixed to the aforementioned substrate by use of any suitable technique or means known in the art. Thus, said reflective layer may be affixed to the substrate either directly or by way of one or more intermediate layers placed between the reflector and the substrate. A suitable adhesive material may be used to affix said reflective layer to the substrate or a suitable primer may be used in addition to the adhesive material. Thus, the phrase "the reflector is superposed over the substrate" as used in this specification and the appended claims means that the reflective layer makes either a direct contact with the substrate or is combined with the substrate by way of one or more intermediate layers placed between the two.

90° retarders are well known in the art of light polarizers. They convert linearly polarized light into circularly polarized light and vice versa when they are positioned so that the optical axes of the retarder are oriented at +45° and −45° with respect to the polarization plane of the incident linearly polarized light. What a 90° retarder does is to divide the incident light (of any polarization characteristics) into two linearly polarized components and retard one of them by a quarter of a cycle. A 90° retarder may comprise, for instance, a polyvinyl alcohol layer which may or may not be stained with a dichroic material such as a dichroic dye said layer having a molecular orientation created as a result of a uniaxial mechanical stretching, for instance. Other plastic materials which can be used for manufacturing a 90° retarder include poly(vinyl acetate), ethylene-vinyl alcohol copolymer, ethylene-vinyl acetate copolymer, poly(ethyleneterephthalate), vinyl polymers, acrylic polymers, polydienes, polyalkenes including polyethylenes, polyalkylene oxides, polyesters, polyamides, polysiloxanes and polyimides. 90° retarder is also known as a quarter wave plate. The structure of the retarder used in this invention should be adjusted to obtain 90° retardation at a suitable operative or target wavelength such as 540 nm. The light retarding effect of said retarder at the target wavelength need not be exactly 90°, but it is desirable that it be substantially 90°. Thus, the term "90° retarder" as used in this specification and the appended claims means a retarder which produces a light retardation of substantially 90° at a suitable operative wavelength within the visible region of the spectrum. Needless to say, the retarder should be substantially transparent.

As mentioned above, a 90° retarder is "superposed over" the aforementioned reflector. Again, the phrase "superposed over" means either that the retarder makes a direct contact with the reflector or that it is combined with the reflector by way of one or more intermediate layers placed between the two. It is preferable to use a clear adhesive such as methylmethacrylate in order to combine the two layers. Ordinarily, the retarder layer is first combined with the aforementioned reflective layer and then the retarder/reflector combination is adhered to the substrate. However, as indicated earlier, any suitable sequence may be used for adhering the reflector and the retarder to the substrate to manufacture the identification card of this invention.

Regardless of the sequence or the manner in which the retarder layer and the reflective layer are laminated over the substrate, the process or processes used for laminating these layers should not have the effect of substantially destroying or reducing the light polarization effect produced by the retarder/reflector combination.

Needless to say, one or more outer layers may be superposed over the aforementioned retarder layer. For instance, a clear protective layer made of a hard plastic may be superposed over the retarder layer in order to preserve the integrity of the retarder/reflector combination and thereby preserve the light polarizing effect produced by said combination.

Any suitable device may be used for detecting alterations of the identification card of this invention. A preferred example of such detection device is a linear light polarizer well known in the art. When a linear light polarizer is placed over said identification card with its polarization axis being oriented at 45° with respect to one of the optical axes of the retarder, alteration of the identification card becomes immediately obvious as a color contrast between the altered and unaltered areas. For instance, when a standard 540 nm quarter wavelength retarder is used, the altered area will appear very dark blue/black with an optical density of greater than 2.5, for instance, and the unaltered area will appear light grey with an optical density of less than 0.4. Since the contrast ratio is greater than 5 in this case, the alteration can readily be detected. The above-described phenomenon occurs due to the following facts. When light passes through said linear polarizer, a linearly polarized light emerges from the polarizer and it goes through the 90° retarder, whereupon right or left-handed circularly polarized light is obtained at the end of the retarder. Upon specular reflection by the partial reflector, the light is converted to left or right-handed circularly polarized light, respectively. When the light makes a return passage through said retarder, it is converted to a linearly polarized light having an orientation perpendicular to the original linear polarization and hence it is substantially blocked by said linear polarizer. The phenomenon described above occurs in those areas of the identification card where the integrity of the retarder/reflector combination has not been damaged, whereas the extent of said phenomenon is substantially reduced in areas where said integrity has been damaged.

The aforementioned light polarization effect need not be present over the entire surface of the identification card. Instead, it may be provided over a selected portion or portions of the identification card. It should be present, however, over at least those portions of the identification card where alteration is likely to be attempted.

The retarder/reflector combination of this invention affixed to the information bearing substrate may substantially be uniform over the entire area, or a portion thereof may carry an invisible marking prepared, for instance, by using a hot metal stamp. In the former case, a subsequent fraudulent alteration of the identification card results in an irregular pattern when the card is analyzed through a suitable analyzer such as a linear polarizer whereas in the latter case it results in the creation of an irregular pattern as well as a partial or total destruction of the invisible marking originally provided in the retarder/reflector combination. Thus, the latter alternative has an advantage that the fraudulent alteration becomes more conspicuous. As is well known, application of a hot stamp against the retarder changes the 90° light-retardation effect of the retarder by rearranging or randomizing the original molecular orientation and/or changing the film thickness and therefore, the amount of retardation which had existed in the unheated portion of the retarder. In the absence of an analyzer such as a linear polarizer superposed over the retarder/reflector combination, the afore-mentioned mark is substantially invisible. However, when the retarder/reflector combination is viewed through an analyzer such as a linear polarizer, the mark becomes clearly visible because of the light-polarization effect produced by the 90° retarder/reflector combination. Needless to say, other means besides a hot stamp may be used for preparing a mark in the retarder as long as they produce a substantial destruction of the light-polarization effect of the retarder. Thus, for instance, an intaglio printing of a strong boric acid/borate solution on the retarder surface may also be used.

As explained above, the present invention provides a tamper-free identification/security card which can be manufactured at low cost using conventional techniques and yet makes it possible to readily detect any alteration of the card by use of a very simple detection device, namely, for instance a linear light polarizer. The present invention is illustrated by the following examples.

EXAMPLE I

A cast film of poly(vinyl alcohol) was drawn to create a quarter wave plate retarder of about 0.002 inch thickness. A poly(ethyleneterephthalate) film of about 0.002 inch thickness was coated with an aluminum layer of about 0.00001 inch thickness by use of a vacuum deposition technique and the aforementioned retarder was laminated to the metalized side of said PET film by use of a thermosetting epoxy adhesive. The resultant laminated film constituting a retarder/partial reflector combination was laminated to a credit card made of poly(vinyl chloride) by use of a customary solvent bonding technique. The upper surface of the credit card was marked with a letter combination by pressing a hot stamp of 300° F. against it for 10 seconds, which altered the highly directional orientation of the PVA molecules only in the areas which made a direct contact with the hot stamp. The letter combination was substantially invisible when the credit card was viewed without the aid of an analyzer, but it was very conspicuous when the card was viewed through a linear polarizer.

EXAMPLE II

A clear PVA film was drawn to create a quarter wave plate retarder of about 0.0015 inch thickness. A PVC film of about 0.015 inch thickness was coated with an aluminum layer of about 0.00001 inch thickness by use of a vacuum deposition technique and the aforementioned retarder was laminated to the metalized side of the PVC film by use of a routine solvent lamination technique. The resultant laminated structure was coated with an identifying mark by intaglio printing of a strong boric acid/borate solution on the retarder surface which selectively rearranged the molecular orientation in those portions of the retarder which were contacted by the solution. Thereafter, the laminated structure was affixed to a credit card by use of a routine technique. The identification mark was substantially invisible when the credit card was viewed without the aid of an analyzer, but it was very conspicuous when the card was viewed through a linear polarizer.

I claim:

1. A tamper-free identification system comprising an information-bearing substrate made of a flexible but substantially rigid material, a partially transparent partial light reflector superposed over said substrate and a substantially transparent 90° retarder superposed over said reflector, said reflector being adapted to produce a substantially nondepolarizing light reflection.

2. The identification card as defined in claim 1, wherein said reflector comprises a plastic layer having a metal layer deposited thereon.

3. The identification card as defined in claim 2, wherein said plastic layer consists essentially of poly(ethyleneterephthalate).

4. The identification card as defined in claim 2, wherein said plastic layer consists essentially of poly(vinyl chloride).

5. The identification card as defined in claim 1, wherein said retarder comprises an oriented plastic material stained with a dichroic material.

6. The identification card as defined in claim 5, wherein said oriented plastic material consists essentially of poly(vinyl alcohol).

7. The identification card as defined in claim 6, wherein the dichroic material consists essentially of a dichroic dye.

8. The identification card as defined in claim 1, wherein said retarder carries a mark which is substantially invisible when the identification card is viewed without the aid of an analyzer but is clearly visible when the identification card is viewed through an analyzer, said mark having been prepared by substantially destroying the 90° light-retardation effect of said retarder.

9. The identification card as defined in claim 8, wherein said retarder comprises an oriented plastic material stained with a dichroic material.

10. The identification card as defined in claim 10, wherein said oriented plastic material consists essentially of poly(vinyl alcohol).

11. The identification card as defined in claim 10, wherein the dichroic material consists essentially of a dichroic dye.

12. The identification card as defined in claim 8, which further comprises a portective layer superposed over the 90° retarder layer.

13. The identification card as defined in claim 8, wherein a light retardation of substantially 90° is produced at an operative wavelength of 540 nm.

14. The identification card as defined in claim 8, wherein said reflector comprises a plastic layer having a metal layer deposited thereon.

15. The identification card as defined in claim 14, wherein said plastic layer consists essentially of poly(ethyleneterephthalate).

16. The indentification card as defined in claim 14, wherein said plastic layer consists essentially of poly(vinyl chloride).

17. The identification card as defined in claim 1, which further comprises a protective layer superposed over the 90° retarder layer.

18. The identification card as defined in claim 1, wherein a light retardation of substantially 90° is produced at an operative wavelength of 540 nm.

* * * * *